July 30, 1929.  M. BURSTEIN  1,722,731
DOOR HANGER
Filed Aug. 20, 1928
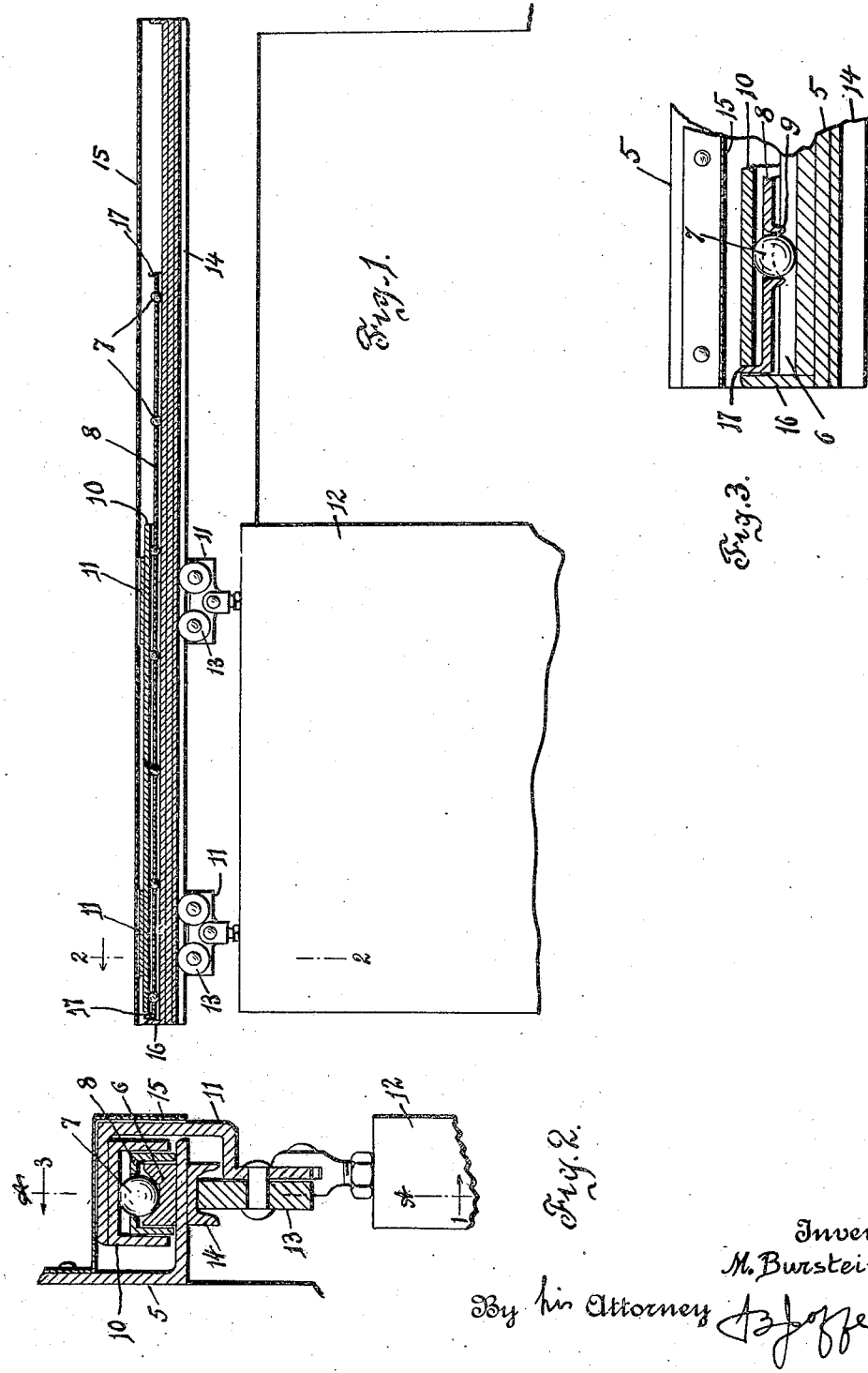
Inventor
M. Burstein
By his Attorney Patented July 30, 1929.

1,722,731

UNITED STATES PATENT OFFICE.

MAX BURSTEIN, OF NEW YORK, N. Y.

DOOR HANGER.

Application filed August 20, 1928. Serial No. 300,706.

My invention relates to hangers for sliding doors provided with balls and races therefor to obtain an easily operatable door.

The object of the invention is to provide a door hanger which uses standard structural members so that the hanger could be manufactured economically.

In the appended drawing Figure 1 is a section on lines A—A in direction of the arrow 1.

Figure 2 is a section on lines 2—2 Figure 1, and

Figure 3 is a section on lines A—A, Figure 2 in the direction of the arrow 3.

The hanger support is an angle iron 5, one side of which is anchored to the wall at the door opening so, that one-half of its length extends over the door opening and the other to that side to which the door is to be moved. In consequence, the length of the angle 5 is at least twice the door opening. The other side of the angle iron 5 forms the bed for the stationary ball race 6 which extends through the entire length of the angle and which is rigidly secured to the same. In the drawing the race 6 is of a special shape, but an ordinary U-channel may be used.

A series of balls 7 are properly spaced in a ball retainer 8, which is a U-channel having suitable lipped apertures 9, see Figure 3, to accommodate the balls 7.

The U-channel retainer 8 fits over the race 6 to telescope thereon. A U-channel 10 forming the movable ball race fits over the ball retainer 8, see Figure 1. The movable or upper race 10 is one-half of the length of the stationary or lower race 6 and the retainer 8 is one and one-half times as long as the movable race or three-quarters of the length of the stationary race.

I have discovered by experiment that the speed of the movable race is twice that of the retainer on the stationary race and that is the reason for the proportions of length given above.

The movable race 10 carries two brackets 11 from which the door 12 is suspended. To prevent the door from being unhung and the parts of the hanger disturbed, I provide the brackets 11 with rollers 13 which roll into a U-channel 14 secured to the same side of the angle 5 to which the stationary race 6 is secured, but on the other face thereof.

The angle 5 carries a hood 15 which extends through the entire length of the angle to cover the parts of the hanger over which the door moves and prevents dust from settling in the stationary and movable parts of the hanger.

The stationary race 6 is provided with end stop 16 to prevent the ball retainer 8 from riding off. The ball retainer 8 has also end stop 17 which will come into engagement with the adjacent end of the movable race 10 when for some unforeseen reason the travel of the retainer in the stationary race 6 is retarded, to force the retainer to move to the end of the stationary race 6 when the door reaches its end position.

I claim:

A door hanger comprising an angle iron, a ball race in the race of a U-channel secured to the angle iron, a U-channel forming a ball retainer in its base and mounted to telescope on the race so that the sides of the channel engage the side of the race, a movable ball race formed by the base of a U-channel mounted to telescope on the retainer so that the sides of the U-channel engage the sides of the retainer, brackets secured to the movable race, rollers carried by the brackets, a U-shaped member carried by the angle iron and engaged by the rollers, and a hood secured to the angle and covering the ball races and retainer.

MAX BURSTEIN.